(12) United States Patent
Lutnick

(10) Patent No.: US 7,379,911 B2
(45) Date of Patent: May 27, 2008

(54) SYSTEMS AND METHODS FOR PROVIDING FINANCIAL INSTRUMENTS INCLUDING CONTRARY POSITIONS

(75) Inventor: Howard W. Lutnick, New York, NY (US)

(73) Assignee: eSpeed, Inc., New York, NY (US)

( * ) Notice: Subject to any disclaimer, the term of this patent is extended or adjusted under 35 U.S.C. 154(b) by 150 days.

(21) Appl. No.: 10/329,103

(22) Filed: Dec. 23, 2002

(65) Prior Publication Data

US 2003/0220865 A1 Nov. 27, 2003

Related U.S. Application Data

(60) Provisional application No. 60/343,885, filed on Dec. 26, 2001.

(51) Int. Cl.
*G06Q 40/00* (2006.01)
(52) U.S. Cl. .................................. 705/37; 705/36 R
(58) Field of Classification Search .............. 705/36 R, 705/37
See application file for complete search history.

(56) References Cited

U.S. PATENT DOCUMENTS 5,193,056 A * 3/1993 Boes ..................... 705/36 R

| | | | |
|---|---|---|---|
| 2001/0049651 A1* | 12/2001 | Selleck ................... | 705/37 |
| 2003/0028468 A1* | 2/2003 | Wong et al. ............. | 705/37 |
| 2003/0046218 A1* | 3/2003 | Albanese et al. ......... | 705/37 |
| 2003/0069826 A1* | 4/2003 | Guidi et al. ............. | 705/37 |
| 2003/0097328 A1* | 5/2003 | Lundberg et al. ......... | 705/37 |
| 2003/0233308 A1* | 12/2003 | Lundberg et al. ......... | 705/37 |

OTHER PUBLICATIONS

Barron's Dictionary Finance and Investment Terms, 6th Edition, Downes and Goodman, Editors, Copyright 1985,1987,1991,1995,1998,2003, Happauge, NY, p. 304.*
Barron's Dictionary of Business Terms, 3rd Edition, Barron's Educational Series, 2000, pp. 118, 662.*
John Downes et al., "Dictionary of Finance and Investment Terms," 1998, 5th Edition, pp. 380 and 689.*

* cited by examiner

*Primary Examiner*—Jagdish N Patel
*Assistant Examiner*—Kenneth L Bartley
(74) *Attorney, Agent, or Firm*—Baker Botts L.L.P.

(57) ABSTRACT

A market for trading hedged instruments is provided. The market includes at least one hedged instrument having a value based at least on a first position on a first tradable instrument and a second position on a second tradable instrument. The second position is contrary to the first position.

21 Claims, 3 Drawing Sheets

SYSTEMS AND METHODS FOR PROVIDING FINANCIAL INSTRUMENTS INCLUDING CONTRARY POSITIONS

RELATED APPLICATIONS

This application claims the benefit of U.S. Provisional Application No. 60/343,885, filed Dec. 26, 2001.

TECHNICAL FIELD OF THE INVENTION

This invention relates in general to tradable financial instruments, and more particularly, to systems and methods for providing financial instruments including contrary positions.

BACKGROUND OF THE INVENTION

Investments having potential for large returns often involve some element of risk. Many approaches have been used to hedge against or otherwise manage risk associated with such investments. One well known way to reduce such risk is through the diversification of investments. In theory, diversification of investments applies the law of averages in order to reduce risk from multiple independent sources.

Many times, however, it is possible to hedge against a first position, such as a market commitment to a tradable asset, for example, by undertaking a second position that may share some common risk factors or elements with the first. In doing so, investors may be presented with different options to hedge against the risk associated with a given position. For instance, an individual interested in investing in a particular stock may be unwilling to bear potential losses beyond a particular level. Since the price of the stock could drop at any time to undesirable levels, such an investment inherently carries an element of risk. To hedge against such risk, the investor may purchase both the stock and a put option. The put option gives the investor the right to sell the stock at a fixed exercise, or strike, price up until a given expiration date. If the stock price drops below the strike price, the investor may execute the put option and profit the difference between the exercise price of the put option and the market price of the stock at the time the put option is executed. In this manner, the investor may protect himself against the risk (and the associated losses) that the stock will decrease in price below the strike price of the put option. Thus, it can be seen that an investor may hedge risk by combining a buy position on a security with the right to exercise a contrary sell position on that same security.

Not only do hedged positions decrease risk, they can be used to ensure a sale that will substantially limit losses. For example, an investor may purchase a stock and sell a call option giving the option buyer the right to buy the stock at an exercise price by a given date. Suppose a pension fund holds 1,000 shares of stock with a current price of $55 per share and intends to sell all 1,000 shares if the stock price reaches $60 per share. By selling $5 calls on all 1,000 shares, each having an exercise price of $60, the fund can make $5,000 in revenues. If the stock price falls, the call options will not be executed and thus the fund's losses due to the fallen stock price will be mitigated by the $5,000 revenues from the sale of the call options. If the stock price rises above $60 (say, to $70 per share) and the call options are exercised, the fund has not lost any potential profits since the fund originally intended to sell its shares at $60 per share anyway.

The examples provided above illustrate how different positions may be combined to hedge against risk and/or create profit opportunities. However, in order to engage in such trades, traders must be well-informed about market conditions to anticipate such opportunities, and must also be able and willing to undertake such commitments. In addition, in order to obtain a particular level of risk protection or profit margin, significant capital and firm commitments are often required, as well as various transaction costs, margin requirements and/or credit and credibility checks.

SUMMARY OF THE INVENTION

In accordance with the present invention, systems and methods for providing hedged financial instruments including, or based on, contrary positions are provided. In general, hedged instruments that combine contrary positions on one or more other tradable instruments are provided. The hedged instruments may be more liquid and require less transaction costs than separately undertaking the same contrary positions on the tradable instruments that make up the hedged instruments.

According to one embodiment, a market for trading hedged instruments is provided. The market includes at least one hedged instrument having a value based at least on a first position on a first tradable instrument and a second position on a second tradable instrument. The second position is contrary to the first position. According to another embodiment, another market for trading hedged instruments is provided. The market includes at least one hedged futures contract having a value based on an index of positions on a plurality of tradable instruments. The positions include a first position on a first tradable instrument and a second position on a second tradable instrument. The second position is contrary to the first position.

According to yet another embodiment, a method for providing a hedged instrument is provided. The method includes identifying a first position on a first tradable instrument and a second position on a second tradable instrument, in which the second position is contrary to the first position. The method further includes undertaking the first position and the second position and creating a hedged instrument including the first position and the second position.

Various embodiments of the present invention may benefit from numerous advantages. It should be noted that one or more embodiments may benefit from some, none, or all of the advantages discussed below.

One advantage is that hedged instruments may provide an investor and opportunity to indirectly participate in contrary positions, without having to actually undertake such positions. In this manner, an investor may be able to hedge particular risks and/or otherwise better control particular investment risks. In addition, hedged instruments may permit an investor to indirectly undertake a position that the investor would not be permitted to directly undertake. For example, an investor who may not be approved to short a particular asset (due to certain credit restrictions, for example) may be approved to trade a hedged instrument including a short position on the particular asset.

Another advantage is that hedged instruments may attract more investors to a particular market, which may increase the liquidity of markets for such hedged instruments as well as markets for readily existing instruments. As a result, such instruments may become less expensive to trade. In addition, commissions may be reduced since a provider may be able to undertake the underlying positions of a hedged instrument for a lower overall commission than other investors, therefore reducing the commissions involved in the underlying positions.

Yet another advantage is that hedged futures contracts may provide various tax advantages. For example, unlike shares of stock or certain funds, hedged futures contracts do not make taxable distributions to investors. Also, hedged futures contracts reduce or avoid taxation associated with the buying and/or selling of underlying instruments that is common with other investment strategies.

Other technical advantages will be readily apparent to one having ordinary skill in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which.

DETAILED DESCRIPTION OF THE INVENTION

Example embodiments of the present invention and their advantages are best understood by referring now to FIGS. 1 through 6 of the drawings, in which like numerals refer to like parts.

This invention relates to systems and methods for providing hedged tradable financial instruments that can be traded in a market. The tradable hedged instruments may include, or be based on, contrary positions on readily available financial instruments.

In an example of a typical investment scenario, an investor buys an instrument such as a stock or a bond, for example, and sells it after some time. This is an example of a long position that is held by the investor who purchases the instrument. To obtain a short position, an investor borrows an instrument from a lender, such as a broker, for example, and immediately sells the instrument to another buyer. After some time, the same investor may then purchase the instrument (or another instance of the same instrument, such as another share of the same stock, for example), hopefully at a lower price than the price at which he sold the borrowed instrument, and return the instrument to the lender, thus covering his or her position while hopefully retaining a profit.

By combining contrary positions in such instruments, an investor may protect him or herself from at least some of the risk associated with undertaking a single position on such instruments. Several sources of uncertainty may introduce elements of risk against which an investor may want to be protected. For example, such risks may be caused by general economic conditions such as the business cycle, changes in the inflation rate, changes in the interest rates, changes in the exchange rates and varying market conditions. Other sources of risk may relate to the actual company or companies issuing assets or other financial instruments, such as credit or default risk, for example.

A hedged instrument may be provided which includes, or is based on, a number of individual positions such as those described above, including positions which are contrary to each other. An investor may trade such an instrument without committing to the individual positions upon which the instrument is based. Thus, in some embodiments, the investor may reduce transaction costs, such as trade commissions, since the investor may enter into a hedged position against a prevailing risk while only paying commissions on a single trade.

Figure 1:
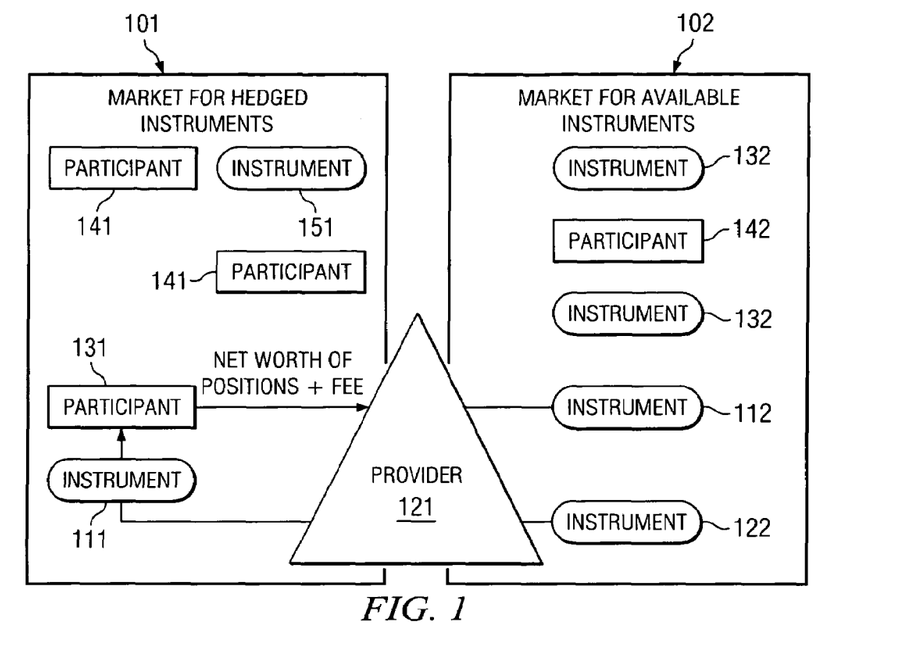
FIG. 1 illustrates an example market in which hedged and available instruments may be traded in accordance with an embodiment of the present invention.

FIG. 1 depicts a market 101 for hedged instruments and a market 102 for readily available instruments. Hedged instruments that include, or are based on, combinations of contrary positions may be traded in market 101, whereas instruments on which such contrary positions are based may be traded in market 102. Thus, in some embodiments, hedged instruments 111 and 151 may be traded in market 101 and available instruments 112, 122, and 132 may be traded in market 102. Available instruments 112, 122, and 132 may include any financial instrument that is available to be traded in a market, such as, for example, securities (such as stocks or bonds, for example), options, futures contracts, currencies and commodities, as well as tradable funds such as index funds, sector funds and sub-sector funds, for example. In some embodiments, hedged instruments 111 and 151 and/or available instruments 112, 122, and 132 may be traded electronically and in real-time or substantially in real-time.

As shown in FIG. 1, market participants 131, 141, and 142 may be potential traders, investors, speculators, brokers, or a firm consisting of any combination of traders, investors, speculators and/or brokers, or any other entity suitable to participate in a trading market. Provider 121, which may create hedged instruments that include, or are based on, contrary positions on available tradable instruments may be a brokerage firm, an investment bank, or any other entity suitable to create and/or issue a financial instrument.

Provider 121 may hold contrary positions on instruments 112 and 122, which may pertain to the same class of instruments. As used throughout this document, the term contrary positions is intended to include positions which are directly, indirectly, completely, or at least partially contrary to each other. In some embodiments, instruments 112 and 122 may be related. For example, instruments 112 and 122 may be the same instrument, instances of the same instrument, instruments pertaining to the same class of instruments or instruments within the same or similar investment sector. Furthermore, one of instruments 112 and 122 may be a derivative of the other. For example, instrument 122 may be a put option on instrument 112 which is a stock. Provider 121 may create instrument 111 by combining contrary positions with respect to already established instruments 112 and 122, as well as various positions on one or more additional tradable instruments.

In some embodiments, provider 121 may interact with markets 101 and 102 in order to provide hedged instruments, such as hedged instrument 111. For example, as shown in the example embodiment of FIG. 1, provider 121 undertakes positions with respect to instruments 112 and 122 and provides hedged instrument 111 for trading. Thus, provider 121 may trade in both markets 101 and 102. Participant 131 may buy hedged instrument 111 in exchange for a price, which may be the net worth of the combined positions in addition to a possible fee for the services provided by provider 121.

In this exchange, participant 131 does not actually undertake any position with respect to instruments 112 or 122. Instead, participant 131 undertakes a position in hedged instrument 111. Participant 131 may then trade instrument 111 with any participant 141 in market 101. Provider 121 may also trade instruments 112 and 122 with any other participant 141 or 142, thereby transferring positions in instruments 112 and 122 to such participants 141 or 142. In some embodiments, markets 101 and 102 may completely, or at least partially, overlap such that hedged instruments 111 and 151 and instruments 112, 122, and 132 may be traded among the same entities. Through such trading, liquidity may be created in both markets 101 and 102.

Some investors may wish to simultaneously undertake contrary positions, such as long and short positions on different types of bonds issued by the same corporation. Such bonds may have different maturity dates, and therefore sell at different prices. By longing one type of corporate bond (in other words, buying a first corporate bond) while shorting another corporate bond (in other words, selling a second corporate bond) with a different maturity date than the first, an investor may create protected profit opportunities based on the future performance of the company issuing the bonds.

An example of undertaking contrary positions on different bonds is provided as follows. Assuming that among the several types of bonds a particular corporation provides, two particular types of bonds are currently trading. The first bond is selling at 70 cents on the dollar with a maturity date of 2004, while the second bond is selling at 60 cents on the dollar with a maturity date of 2007. Both bonds may pay 10% yearly interest. The 2007 bond sells at a larger discount since it matures three years after the 2004 bond and thus carries more credit risk. A speculator who believes the issuing corporation is at risk of defaulting on its bonds in the future may wish to short one or more of the company's bonds. However, this may involve undertaking large risks due to the binding commitment to deliver interest coupons as well as the par value of the bond at maturity. Moreover, if the price of the bond does not drop in the future, the speculator is faced with buying back the same kind of bond to cover his or her position at a high price, thus incurring significant losses.

Instead, the speculator may undertake a long position on the 2004 bond and a short position on the 2007 bond. In other words, the speculator may long the 2004 bond and short the 2007 bond. Such an investment strategy may offer significant profit opportunities in the case that the corporation defaults or its bonds devaluate, especially after the year 2004 since the 2004 bond will have matured and paid the speculator its par value of $1,000. Moreover, the yearly interest payments of $100 to which the speculator may be committed with respect to the 2007 bond will be offset by the $100 yearly coupons received from longing the 2004 bond.

Figure 2:
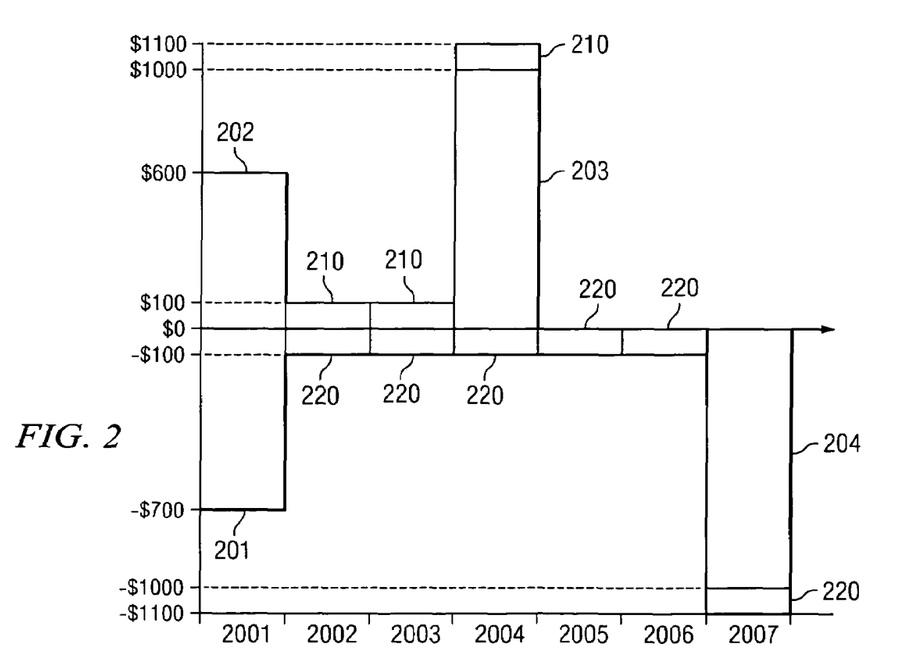
FIG. 2 is a chart illustrating the payments and payoffs associated with the long and short positions on two bonds over time in accordance with an embodiment of the present invention.

The following illustrates an example hedged instrument according to one embodiment of the present invention. Suppose a trader undertakes a long position on the 2004 bond and a short position on the 2007 bond at the end of the year 2001. As shown in FIG. 2, which illustrates a chart of the various payoffs associated with such an investment scheme versus time, the trader would have to pay $700 (indicated as payment 201) for the long position in return for $600 (indicated as payoff 202) from the short position in the original year 2001. Over the next three years, the trader will expect to receive $100 in yearly coupons (indicated as payoffs 210) on the 2004 bond and incur a $100 expense in yearly coupons (indicated as payments 220) on the 2007 bond. Once the 2004 bond reaches maturity, the trader will expect to receive the $1000 par value (indicated as payoff 203) associated with the 2004 bond, while maintaining payment of $100 coupons 220 until the year 2007, at which time the trader will be obligated to the pay par value of $1000 (indicated as payment 204) for the 2007 bond.

After the year 2004, the trader may wait until the 2007 bond maturity date and pay par value 204, or may chose to cover his or her short position. If the corporation devalues, the trader may buy back a 2007 bond at a gain due to the devaluation of the corporate 2007 bond. In some embodiments, the trader may undertake the long and short positions on the 2004 and 2007 bonds as described above, and provide or sell a hedged instrument that provides a payoff based at least in part on the combined payoffs and payments discussed above regarding the 2004 and 2007 bonds.

Figure 3:
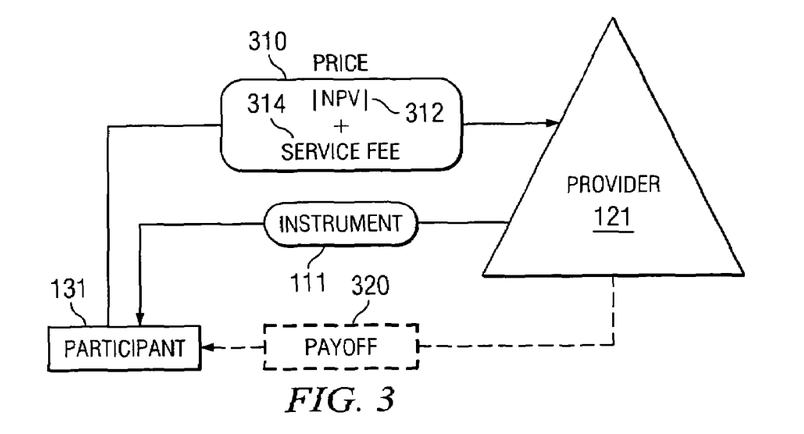
FIG. 3 illustrates an example transaction of a hedged instrument that includes the contrary positions of FIG. 2 in accordance an embodiment of the present invention.

FIG. 3 illustrates the details of an example trade of hedged instrument 111 between participant 131 and provider 121 in accordance with one embodiment of the present invention. Hedged instrument 111 includes, or is based on, the long and short positions described above. An investor or participant 131 may purchase hedged instrument 111 issued or sold by provider 121 for a particular price 310 that may include the total costs incurred by provider 121 in undertaking the various positions on the underlying instruments. In addition, in some embodiments, the price 310 may also include a service fee 314.

Thus, in the example discussed above, price 310 may consist of net present value 312 of the total payments and payoffs involved with longing the 2004 bond and shorting the 2007 bond, plus service fee 314. Net present value 312 may correspond to the net yearly payoffs (−$100, $0, $0, +$1000, −$100, −$100, and −$1100) for each of the years 2001 through 2007. In some embodiments, net present value 312 may be evaluated at an agreed upon discount rate. For example, if the discount rate is assumed to be %5, net present value 312 would amount to about −$220. Therefore, the cost of such an investment to provider 121 may be calculated by the absolute value of net present value 312, which may be less expensive than purchasing one of the two bonds, due to the offsets created by the combined contrary positions.

In return for the investment, participant 131 may receive at least a portion of the net capital gain realized if provider 121 covers his or her short position with respect to the 2007 bond. For example, if the issuing corporation defaults on its bonds or if its bonds devaluate, provider 121 may realize a substantial gain, of which at least a portion may be transferred to participant 131 as payoff 320. Otherwise (such as in the case that the bonds do not devaluate), the gains and losses from the contrary positions on the 2004 and 2007 bonds substantially offset each other, and payoff 320 may be a relatively small negative number. In that case, provider 121 may charge participant 131 the value of the net capital loss or an amount based on the net capital loss. In summary, provider 121 receives a payment from participant 131 and provides participant 131 an opportunity to make significant profits at a relatively low cost, and without committing to any position on any underlying instrument. In some embodiments, participant 131 may trade instrument 111 with any other suitable entity, which may similarly trade instrument 111 to another entity, and so on, until the maturity date of instrument 111 or some other predefined date. In addition, in some embodiments, provider 121 may be operable to trade the underlying instruments (such as the 2004 and 2007 bonds in the example discussed above) of the hedged instruments individually.

As another example, a hedged instrument may be based on a "money spread" on a particular stock (or other suitable instrument). A money spread may be obtained by combining two or more call options (or two or more put options) on the same stock with different exercise prices, in which one call may be bought and one sold, to obtain contrary positions on the same stock.

Figure 4:
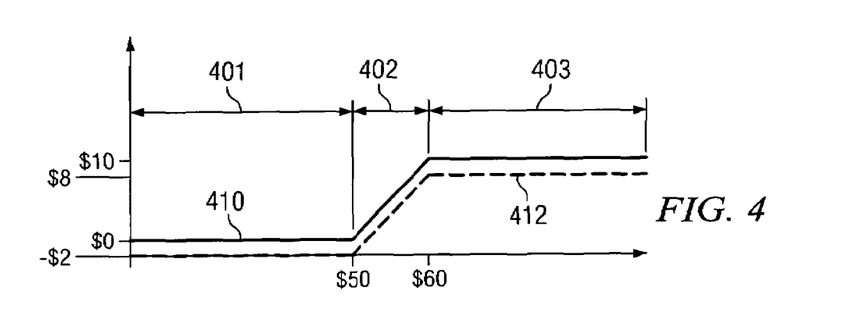
FIG. 4 is a chart illustrating the returns and profits associated with a combination of options versus price in accordance with an embodiment of the present invention.

For example, suppose a first call option having an exercise price of $50 is purchased for $5, and a second call option having the same maturity date as the first and having an exercise price of $60 is sold (or written) for $3. The payoff of these combined positions is the difference between the values of the bought and sold calls. FIG. 4 illustrates the return and profit on a hypothetical money spread versus the stock price for the pair of call options discussed above. Bold line 410 in FIG. 4 represents the payoff of the money spread, whereas dotted line 412 represents the profit of the money spread based on the contrary positions described above. FIG. 4 illustrates three possible outcomes: a low-price region 401, a middle-price region 402, and a high-price region 403. If the stock price is less than $50 (as shown in region 401), neither of the options will typically be exercised. In this case, the profit of such an investment would be −$2 from buying the first option for $5 and selling the second option for $3.

On the other hand, if the stock price is greater than $50 but less than $60, as shown in region 402, the first option will typically be exercised while the second will not. The entity that purchased the first call has the right to buy the stock at $50, which is less than the current value of the stock. That entity may then immediately sell the stock at the higher current stock price and receive the net profit shown by dotted line 412 in region 402.

If the stock price exceeds $60, as shown in region 403, both call options will typically be exercised. The entity owning the first call buys the stock realizing a capital gain whereas the entity owning the second call buys back the stock from the former at the same price. The former investor's payoff is therefore fixed at $10 with a profit of $8. These figures remain constant as long as the stock price remains greater than or equal to $60, as shown in region 403.

This scheme may be referred to as a bullish spread, since the payoff either increases or is unaffected by increases in the stock price. One motivation for a bullish spread may be that the investor buying the first call would rather capture some fixed profit (at the minimal risk of losing a relatively small amount) than purchase the stock itself when he or she believes one option is overpriced relative to another.

Figure 5:
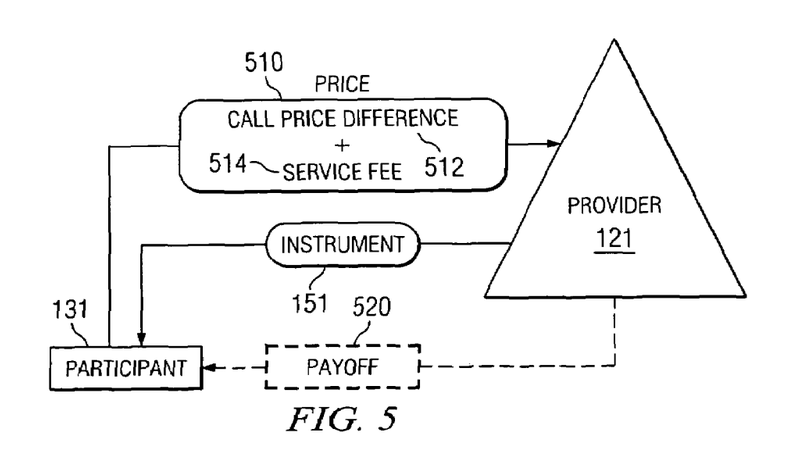
FIG. 5 illustrates an example transaction of the hedged instrument that includes the contrary positions of FIG. 4 in accordance with an embodiment of the present invention.

Thus, in some embodiments, a trader may purchase a first call option and sell a second call option and provide a hedged instrument including, or based on, a money spread created by the two options as described above. FIG. 5 illustrates the details of an example trade of a hedged instrument 151 between participant 131 and provider 121 in accordance with one embodiment of the present invention. Hedged instrument 151 combines, or is based at least in part on, the individual positions of a money spread on the same stock as described above. The trader or provider 121 may issue instrument 151 which results in payoff 520. Payoff 520 may be the difference between the stock price and the lower exercise price if the stock price falls below the lower exercise price, or the difference between both exercise prices ($10) if the stock price exceeds the higher exercise price.

Provider 121 may sell instrument 151 to participant 131 for price 510. Price 510 may include the net cost of undertaking the underlying positions of the hedged instrument. Thus, in the example provided above, price 510 may include the $2 price difference 512 between the two call options. In addition, in some embodiments, price 510 may include a service fee 514.

As another example, hedged instrument 151 may include, or be based on, one or more futures contracts. For example, a particular hedged instrument may include, or be based on, a long position on a first futures contract and a short position on a second futures contract. In some embodiments, hedged instrument 151 itself comprises a futures contract which may be traded in any suitable market. For example, hedged instrument 151 may be a futures contract that includes or is based on two or more underlying futures contracts, two or more of which are contrary.

Thus, hedged instrument 151 may be a hedged futures contract having a value, or price, based on positions undertaken on any two or more underlying instruments. For example, such positions may include a long position on a first stock and a short position on a second stock. As another example, such positions may include a long position on a stock and a short position on a tradable fund, such as an index fund or a fund related to a particular investment or technology sector or sub-sector, for example, or vice versa. As yet another example, such positions may include a long position on a stock and a short position on a tradable instrument having a value based at least on the value of a plurality of stocks within an investment sector. As yet another example, at least one of the underlying positions may comprise a position which corresponds with, or tracks, the price of a particular tradable instrument. For example, a particular hedged futures contract may be based on a first position comprising a long position which corresponds with, or tracks, the price of a first tradable instrument (such as a stock, bond, tradable fund or currency, for example) and a second position comprising a short position which corresponds with, or tracks, the price of a second tradable instrument.

In some embodiments, hedged instrument 151 may be a hedged futures contract having a value or price based at least in part on an index of positions on a plurality of tradable instruments. In one embodiment, the value or price of a particular hedged instrument 151 follows or tracks (to at least some extent) the value or price of such an index. The value or price of such index may be calculated based on the value of various positions on a variety of underlying tradable instruments. The positions upon which such an index are based may include, for example, any of the various combinations of positions discussed above. For example, in a particular embodiment, a provider may provide a hedged futures contract which tracks the value or price of a particular index. The index may be based at least in part on a long position on one or more stocks and a short position on one or more tradable funds, such as tradable industry sector funds. A provider may create, provide and/or manage any number of different hedged futures contracts as well as the underlying indexes. The value or price of a hedged futures contract may also include one or more fees, which may include various transaction and/or commission fees, for example.

Hedged futures contracts may be more efficient than similar investments since they do not require the provider to actually purchase and/or sell the underlying instruments, such as stocks, bonds or currencies, for example. In addition, hedged futures contracts may provide various tax advantages. For example, unlike shares of stock or certain funds, hedged futures contracts do not make taxable distributions to investors. Also, hedged futures contracts reduce or avoid taxation associated with the buying and/or selling of underlying instruments that is common with other investment strategies.

It should be understood that with regard to all of the hedged instruments discussed herein, the number of long positions need not correspond to the number of short positions undertaken. Potential investors or providers may choose to combine any number of contrary positions on the same or any number of different instruments as desired in order to create a particular hedged instrument. Any suitable contrary positions on any suitable instrument or instruments may be combined or used as a basis to create a tradable hedged instrument that may be traded by any participant within a market.

Combinatory schemes such as the ones described above may be advantageous since they may give interested entities the opportunity to virtually participate in such contrary positions, without having to actually undertake such positions. In addition, in some embodiments, investors who may not be able to trade particular underlying instruments may be able to trade hedged instruments including or based on such underlying instruments. For example, an investor who may not be able to may not be approved to short a particular asset (due to certain credit restrictions, for example) may be approved to trade a hedged instrument including a short position on the particular asset. Moreover, hedged instruments such as those discussed above may attract more investors to a particular market, which may increase the liquidity of markets for such hedged instruments as well as markets for readily existing instruments. As a result, such instruments may become less expensive to trade. In addition, commissions may be reduced since a provider may be able to undertake the underlying positions of a hedged instrument for a lower overall commission than other investors, therefore reducing the commissions involved in the underlying positions.

In addition, by presenting potential investors with a variety of hedged instruments that include various desirable combinations of positions, such potential investors may save the time and effort needed to identify such desirable combinations of positions. Furthermore, trading such hedged instruments may provide accounting advantages and opportunities for companies to restructure their balance sheets. For example, in some situations, a hedged instrument may be included in a balance sheet (such as the balance sheet of the buyer or seller of the hedged instrument, for example) without including each of the individual underlying positions of the hedged instrument, making the underlying positions transparent and thus simplifying the balance sheet.

Figure 6:
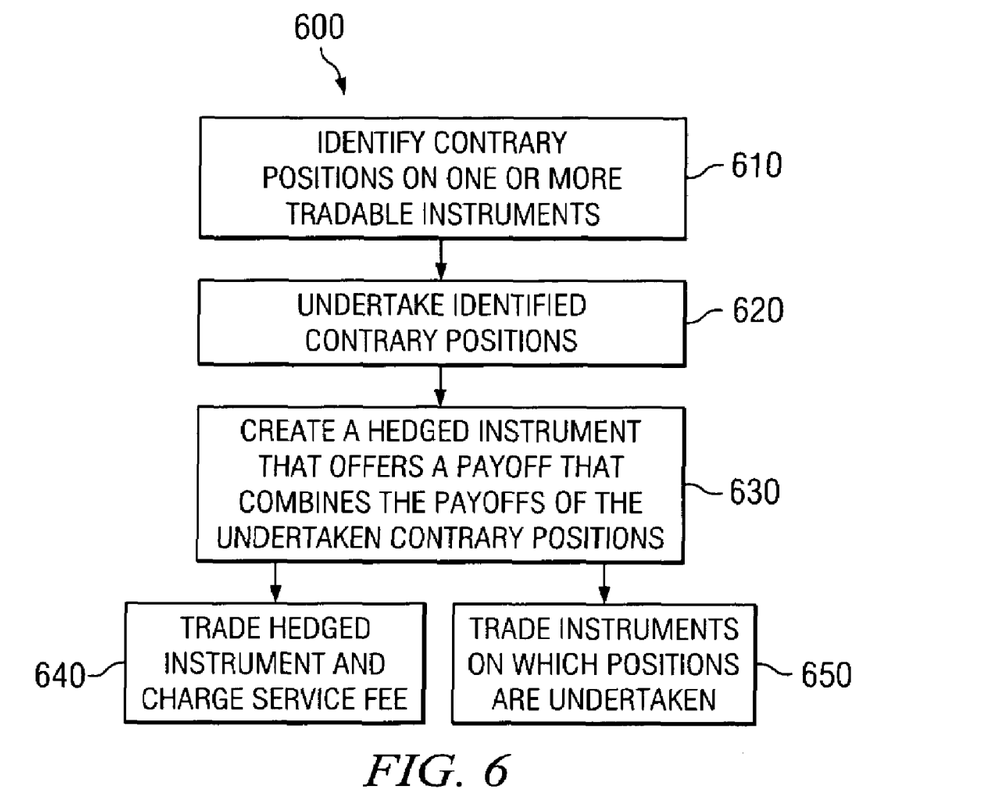
FIG. 6 is a flow chart illustrating an example method for providing a hedged instrument in accordance with an embodiment of the present invention.

FIG. 6 is a flow chart 600 illustrating an example method for providing a hedged instrument including, or based on, contrary positions in two or more underlying instruments in accordance with an embodiment of the present invention. At step 610, two or more fully or at partially contrary positions on one or more tradable instruments may be identified by a provider (in other words, the entity wishing to create a tradable hedged instrument). The provider may then undertake the identified positions at step 620. At step 630, the provided may create and/or issue a hedged instrument that offers a payoff that combines or is based on the payoffs of the underlying positions. The provider may then sell the hedged instrument to another entity at step 640 for a price which may include the net worth of the combined positions in addition to a service fee. In some embodiments, the provider may buy back the hedged instrument if desired or if one or more of the undertaken positions is recalled. In addition, the provider may also trade the underlying instruments on which the positions were undertaken with yet another entity at step 650.

Although an embodiment of the invention and its advantages are described in detail, a person skilled in the art could make various alternations, additions, and omissions without departing from the spirit and scope of the present invention as defined by the appended claims.

What is claimed is:

1. A system for executing trades in a market for trading hedged instruments, the system comprising:
   one or more participant interfaces each programmed to electronically transmit orders from a market participant to a trading platform;
   the trading platform programmed to:
      receive an order from a participant interface;
      undertake a plurality of positions in at least a first tradable instrument and a second tradable instrument for an instrument provider;
      in response to receiving the order from the participant interface, execute a sale of a hedged instrument between the instrument provider and a market participant based, at least in part, on information in the order, wherein the value of the hedged instrument is based at least on:
         a first position on the first tradable instrument, wherein the first position comprises a long position on a first bond; and
         a second position on the second tradable instrument, the second position being contrary to the first position, wherein the second position comprises a short position on a second bond issued by a same corporation as the first bond and having a different maturity date from the first bond, and
      wherein the trading platform is operable to execute the sale without the market participant acquiring a position in either of the first tradable instrument and the second tradable instrument.

2. The system of claim 1, wherein the first tradable instrument and the second tradable instrument relate to a single class of instruments.

3. The system of claim 1, wherein the hedged instrument has a price comprising a service fee plus the net value of the first and the second positions.

4. The system of claim 1, wherein the hedged instrument has a payoff comprising the combined payoffs of the first position and the second position.

5. The system of claim 1, wherein the hedged instrument comprises a futures contract.

6. A system for executing trades in a market for trading hedged instruments, the system comprising:
   one or more participant interfaces each programmed to electronically transmit orders from a market participant to a trading platform;
   the trading platform programmed to:
      receive an order from a participant interface;

undertake a plurality of positions in at least a first tradable instrument and a second tradable instrument for an instrument provider;

in response to receiving the order from the participant interface, execute a sale of a hedged futures contract between the instrument provider and a market participant based, at least in part, on information included in the order, wherein the value of the hedged futures contract is based on an index of positions on a plurality of tradable instruments, the positions including:

a first position on the first tradable instrument, wherein the first position comprises a long position on a first bond; and a second position on the second tradable instrument, wherein the second position comprises a short position on a second bond issued by a same corporation as the first bond and having a different maturity date from the first bond, and wherein the trading platform is operable to execute the sale without the market participant acquiring a position in either of the first tradable instrument and the second tradable instrument.

7. The system of claim 6, wherein:
the hedged futures contract has a maturity time; and
the hedged futures contract may be traded multiple times until the maturity time.

8. An apparatus for executing sales of hedged instruments, the apparatus comprising:

means for undertaking a plurality of positions in at least a first tradable instrument and a second tradable instrument for an instrument provider;

means for electronically receiving an order from a market participant;

means for executing a sale of a hedged instrument between the instrument provider and the market participant in response to receiving the order and based, at least in part, on information included in the order, wherein a value of the hedged instrument is based on at least:

a first position on at least a first tradable instrument, wherein the first position comprises a long position on a first bond; and a second position on at least a second tradable instrument, wherein the second position comprises a short position on a second bond issued by a same corporation as the first bond and having a different maturity date from the first bond, and wherein the sale is executed without the market participant acquiring a position in either of the first tradable instrument and the second tradable instrument.

9. The apparatus of claim 8, wherein the first tradable instrument and the second tradable instrument relate to a single class of instruments.

10. The apparatus of claim 8, wherein the hedged instrument has a price comprising a service fee plus the net value of the first and the second positions.

11. The apparatus of claim 8, wherein the hedged instrument has a payoff comprising the combined payoffs of the first position and the second position.

12. The apparatus of claim 8, wherein the hedged instrument comprises a futures contract.

13. An apparatus for executing sales of hedged futures contracts, the apparatus comprising:

means for undertaking a plurality of positions in at least a first tradable instrument and a second tradable instrument for an instrument provider;

means for electronically receiving an order from a market participant;

means for executing a sale of a hedged futures contract between the instrument provider and the market participant in response to receiving the order and based, at least in part, on information included in the order, wherein a value of the hedged futures contract is based on at least a value of an index of positions on a plurality of tradable instruments, the positions including:

a first position on a first tradable instrument, wherein the first position comprises a long position on a first bond; and a second position on a second tradable instrument, wherein the second position comprises a short position on a second bond issued by a same corporation as the first bond and having a different maturity date from the first bond, and wherein the sale is executed without the market participant acquiring a position in either of the first tradable instrument and the second tradable instrument.

14. The apparatus of claim 13, wherein:
the hedged futures contract has a maturity time; and
the hedged futures contract may be traded multiple times until the maturity time.

15. A method for providing a hedged instrument in an electronic trading environment, the method comprising:

electronically initiating a transaction to undertake a first position on a first tradable instrument, wherein the first position comprises a long position on a first bond;

electronically initiating a transaction to undertake a second position on a second tradable instrument, wherein the second position comprises a short position on a second bond issued by a same corporation as the first bond and having a different maturity date from the first bond;

creating a hedged instrument wherein a value of the hedged instrument is based at least on the first position and the second position;

electronically receiving an order from a market participant; and initiating, in response to receiving the order, a sale of the hedged instrument to the market participant without the market participant undertaking a position in either of the first tradable instrument and the second tradable instrument.

16. The method of claim 15, wherein electronically initiating a transaction to undertake the second position comprises electronically initiating a transaction to undertake a second position relating to the same class of instruments as the first position.

17. The method of claim 15, wherein initiating the sale of the hedged instrument comprises initiating a sale of the hedged instrument at a price comprising a service fee plus the net value of the first and the second positions.

18. The method of claim 15, further comprising returning a payoff to a buyer of the hedged instrument, the payoff based on the combined payoffs of the first position and the second position.

19. The method of claim 15, wherein the hedged instrument comprises a futures contract.

20. A method for providing a hedged futures contract in an electronic trading environment, the method comprising:

electronically initiating a transaction to undertake a first position on a first tradable instrument, wherein the first position comprises a long position on a first bond;

electronically initiating a transaction to undertake a second position on a second tradable instrument, wherein the second position comprises a short position on a second bond issued by a same corporation as the first bond and having a different maturity date from the first bond;

creating an index comprising the first position and the second position;

creating a hedged futures contract having a value based on the index;

electronically receiving an order from a market participant;

initiating, in response to receiving the order, a sale of the hedged futures contract to the market participant without the market participant undertaking a position in either of the first tradable instrument and the second tradable instrument as a result of the sale of the hedged futures contract.

21. The method of claim 20, wherein:

the hedged futures contract has a maturity time; and the hedged futures contract may be traded multiple times until the maturity time.

* * * * *